March 20, 1951     E. M. CALLENDER     2,545,805

HEATING APPARATUS

Filed July 31, 1946

*INVENTOR*
Edwin M. Callender.

BY *Donald B Waite*
               *ATTORNEY*

Patented Mar. 20, 1951

2,545,805

UNITED STATES PATENT OFFICE 2,545,805

HEATING APPARATUS

Edwin M. Callender, Cynwyd, Pa., assignor to The Budd Company, Philadelphia, Pa., a corporation of Pennsylvania Application July 31, 1946, Serial No. 687,443

2 Claims. (Cl. 219—34)

This invention relates to heating apparatus and has for an object the provision of improvements in this art.

One of the objects of the invention is to provide a radiant heating panel having transmission of heat by radiation at a maximum and transmission by convection and conduction at a minimum.

Another object is to provide a heating panel having a transparent space and enclosure which will freely pass long infra-red heat emanations, particularly those of a low temperature up to about 150° F.

Another object is to provide a heating panel having a plurality of trapped low pressure or vacuum spaces and enclosures which will freely pass long infra-red low temperature heat emanations.

The above and other objects and advantages of the invention will be apparent from the following description of certain exemplary embodiments, reference being made to the accompanying drawings, wherein.

Figure 1:
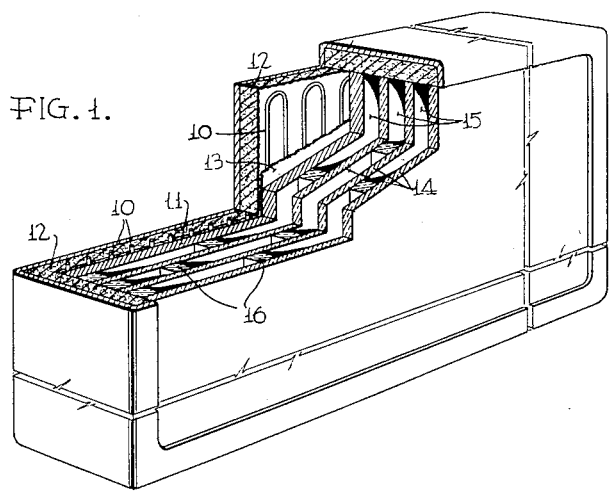
Fig. 1 is a transverse section in perspective through a heating panel embodying the present invention.

In the form shown in Fig. 1 the heating panel comprises a heating element 10, such for example as an electrical resistance, arranged closely adjacent but electrically insulated from a heat radiating sheet 11, preferably of metal, which distributes the heat evenly over its entire surface area. If the sheet is to heat from only one side, it is insulated on the other side, as by heat insulation 12. The thin electrical insulation between the heating element and the heat radiating sheet is indicated by the numeral 13.

If the radiating sheet were left uncovered so as to be in contact with the air this would cause convection currents and drafts and some heat transfer also by conduction. The convection and conduction heating is largely a heat loss because it is desired that the person be heated principally by radiant heat rays insofar as the present device is concerned.

According to the present invention the convection and conduction losses are substantially prevented, or at least greatly minimized, by forming a transparent enclosure in front of the heating sheet to inhibit travel of air but to permit radiant heat rays to pass without substantial loss. One or more sheets 14 of glass, plastic or other material known to pass infra-red heat rays freely are mounted in spaced relation to the radiant sheet 11 and to each other to form dead air or vacuum spaces 15 in front of the heating sheet. The spaces when not evacuated may be broken up by partitions 16 to minimize air flow within the enclosed space itself and intersheet transfer of heat. The sheets themselves will then be substantially unheated since they are largely transparent to radiant heat rays of low temperatures.

By providing a number of sheets 14 in superimposed relation and with dead air spaces between them such transfer of heat between sheets as there may be is largely eliminated by the time the outer sheet is reached and it may be substantially unheated. That is, it will be at about the temperature of the passenger compartment or space, which prevailing temperature may be established and maintained by other means, as for example, by the air of an air conditioning system. This ambient temperature, however, may be kept lower than usual if the improved radiant heating panel is used while still maintaining body comfort. In fact the air if slightly chilly by usual standards, say about 65° F., may be exhilarating if the radiant heating panel is used, the condition of a sunny spring day being largely duplicated.

The transparent panels preferably do not have smooth polished surfaces since non-polished surfaces are more transparent to low temperature heating rays. Transparency to visual rays is not a primary consideration. The surface of the radiant panel also is more efficient if not polished, a dull coating such as a grainy dark paint being well known to have superior heat radiating properties.

Figure 2:
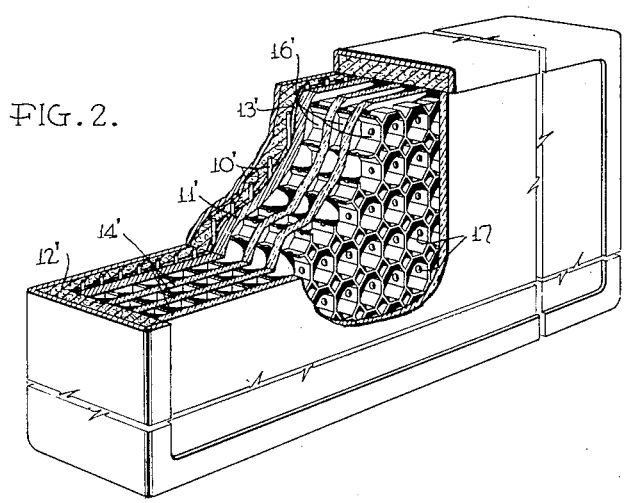
Fig. 2 is a transverse section in perspective through a modified heating panel.
Figure 3:
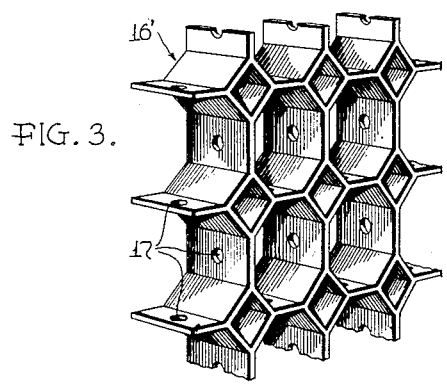
Fig. 3 is an enlarged perspective of a segment of Fig. 2.

The form shown in Figs. 2 and 3 is similar to that shown in Fig. 1 and corresponding parts are designated by the same reference character with a prime (') added, but the spacing means 16' is formed as a honeycomb, say of a molded plastic. Preferably, also, the honeycomb partitions are provided with very small holes 17 whereby they are connected so as to be easily evacuated from a single outlet which is later sealed, yet substantially to prevent transfer between cell spaces of any air which may remain.

Figure 4:
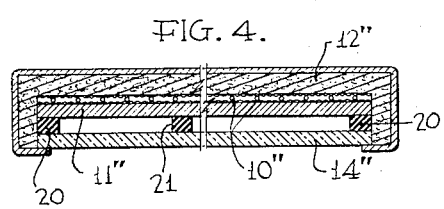
Fig. 4 is a sectional view of another modified heating panel.

The form shown in Fig. 4 employs a heating panel 11" and a heating element 10" insulated electrically and also by thermal insulation 12".

Here a single transparent panel 14'' is used and a high vacuum is provided in the sealed space between the panel 14'' and the heating panel 11''.

A sealing strip 20 is used around the entire periphery of the panel to furnish a vacuumtight seal, the evacuating opening or tube through it (not shown) being sealed after evacuation. Interiorly a plurality of spacers 21 are provided for taking the high inward pressures caused by the internal evacuation and to permit relatively thin panel sheets to be used. These spacers are quite small, spaced relatively far apart, and are made of a poorly heat conductive material so that the conduction of heat through them is very slight; yet they fully support the panels against collapse or breakage. Their actual spacing will depend on the kind and thickness of material used for the panels. And the spacers themselves may be made of a material like or similar to that of the outer panel so as to pass low temperature radiant heat rays.

Where a honeycomb instead of laterally spaced spacers is used in the vacuum space, the webs will be so thin and far apart as to minimize heat transfer by conduction while furnishing full support against collapse or breakage.

Materials suitable for the passage of radiant heat rays and exclusion of convection currents and heat conduction are known. Besides suitable types of glass there may be mentioned methyl cellulose, cellulose acetate, rocksalt, and others. Besides the panels 14'', the spacers 21 or honeycomb, if used, also may be made of the same material.

It is thus seen that constructions are provided which minimize heat transfer by convection and conduction and permit good transfer by radiant heat rays, particularly low temperature rays up to about 150° F. These constructions employ spaced panels and enclosed spaces. Vacuum spaces are preferred and the present invention provides ample panel support with minimum heat conduction areas when a vacuum space is used. Where air is enclosed the spacers are more confining so as to produce a number of relatively dead air spaces and to minimize air movement. It may be necessary to use more than one confining panel with the heating panel when air spaces are used but when a vacuum is used one confining panel is adequate.

While certain embodiments of the invention have been described for illustration, it is to be understood that there may be various embodiments within the limits of the prior art and the scope of the subjoined claims.

What is claimed is:

1. Heating apparatus comprising in combination, a radiant heating panel producing radiant heat substantially uniformly over an extensive surface area, a plurality of superposed parallel plates disposed in spaced relationship vertically away from the surface of said heating panel, said plates being transparent to radiant heat rays but being closed against convection currents and being low heat conductors, means sealing the spaces as a whole above the panel and between plates with a vacuum therebetween, and partition walls in each space dividing it into honeycombs of smaller spaces, the partition walls being perpendicular to the heating panel and plates.

2. Heating apparatus comprising in combination, a radiant heating panel producing radiant heat substantially uniformly over an extensive surface area, a plurality of superposed parallel plates disposed in spaced relationship vertically away from the surface of said heating panel, said plates being transparent to radiant heat rays but being closed against convection currents and being low heat conductors, means sealing the spacers as a whole above the panel and between plates with a vacuum therebetween, and partition walls in each space dividing it into honeycombs of smaller spaces, the partition walls being perpendicular to the heating panel and plates, said partition walls being provided with small interconnecting holes to equalize pressure and relieve the spaces during evacuation and during heating if any air remains after evacuation.

EDWIN M. CALLENDER.

REFERENCES CITED

The following references are of record in the file of this patent:

UNITED STATES PATENTS

| Number | Name | Date |
|---|---|---|
| 946,772 | Coleman | Jan. 18, 1910 |
| 1,239,770 | Coleman | Sept. 11, 1917 |
| 1,317,883 | Meacham | Oct. 7, 1919 |
| 1,701,096 | Bowling et al. | Feb. 5, 1929 |
| 1,987,147 | Gross | Jan. 8, 1935 |
| 2,041,631 | Athill | May 19, 1936 |
| 2,233,190 | Amorosi | Feb. 25, 1941 |
| 2,398,371 | Geispacher | Apr. 16, 1946 |

FOREIGN PATENTS

| Number | Country | Date |
|---|---|---|
| 115,431 | Australia | July 16, 1942 |
| 304,779 | Great Britain | Mar. 27, 1930 |